(12) United States Patent
Watanabe

(10) Patent No.: US 11,047,158 B2
(45) Date of Patent: Jun. 29, 2021

(54) JOINING STRUCTURE OF TWO DOOR MEMBERS FORMING DOOR FOR ENTRANCE OPENING AND CLOSING OF AIRCRAFT LAVATORY UNIT

(71) Applicant: The Yokohama Rubber Co., LTD., Tokyo (JP)

(72) Inventor: Kazumasa Watanabe, Hiratsuka (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 17/047,378

(22) PCT Filed: Apr. 11, 2019

(86) PCT No.: PCT/JP2019/015817
§ 371 (c)(1),
(2) Date: Oct. 13, 2020

(87) PCT Pub. No.: WO2019/198798
PCT Pub. Date: Oct. 17, 2019

(65) Prior Publication Data
US 2021/0115716 A1    Apr. 22, 2021

(30) Foreign Application Priority Data

Apr. 13, 2018   (JP) .............................. JP2018-077481

(51) Int. Cl.
*E05D 11/00*      (2006.01)
*E05F 1/08*       (2006.01)
(Continued)

(52) U.S. Cl.
CPC ........ *E05D 11/0054* (2013.01); *B64C 1/1461* (2013.01); *E05D 3/02* (2013.01);
(Continued)

(58) Field of Classification Search
CPC ......... E05D 11/0054; E05D 2011/0063; E05D 2011/0072; E05D 3/122; E05D 1/00;
(Continued)

(56) References Cited

U.S. PATENT DOCUMENTS 2,910,741 A * 11/1959 Dettman ................. E06B 7/367
49/383
3,949,801 A * 4/1976 Sasaki ....................... E05D 1/04
160/229.1
(Continued)

FOREIGN PATENT DOCUMENTS

FR    2523199 A1 * 9/1983  ............. E06B 7/367
GB    2505720 A  * 3/2014  ............. E06B 7/367
(Continued)

OTHER PUBLICATIONS

International Search Report for International Application No. PCT/JP2019/015817 dated May 28, 2019, 3 pages, Japan.

*Primary Examiner* — Chucky Y Mah
(74) *Attorney, Agent, or Firm* — Thorpe North & Western

(57) ABSTRACT

A joining structure for two door members forming a door member for entrance opening and closing of an aircraft lavatory unit is configured so that a pair of brackets provided on the pair of door members are joined swingably by a bracket joining shaft; and one ends of a pair of covers are joined to the pair of brackets by bracket cover joining shafts, and the other ends of the pair of covers are joined swingably by a cover joining shaft, at a section farther away from the lavatory than the bracket joining shaft.

7 Claims, 10 Drawing Sheets

(51) Int. Cl.
*B64C 1/14* (2006.01)
*E05D 3/02* (2006.01)
*E05D 5/06* (2006.01)
*E05F 1/12* (2006.01)
*E05D 7/00* (2006.01)

(52) U.S. Cl.
CPC ............... *E05D 5/06* (2013.01); *E05D 7/009* (2013.01); *E05F 1/1215* (2013.01); *E05Y 2201/11* (2013.01); *E05Y 2201/484* (2013.01); *E05Y 2600/46* (2013.01); *E05Y 2900/502* (2013.01)

(58) Field of Classification Search
CPC ... E05D 7/009; E05C 17/54; E05Y 2900/132; E05Y 2900/502; E05Y 2600/46; E05Y 2600/41; E05Y 2201/10; E05Y 2201/11; E05Y 2201/484; E05Y 2201/496; Y10T 16/533; Y10T 16/5335; Y10T 16/541; Y10T 16/542; Y10T 16/5388
See application file for complete search history.

(56) References Cited

U.S. PATENT DOCUMENTS

| | | | | |
|---|---|---|---|---|
| 4,679,277 A * | 7/1987 | Shibata | ................... | E05D 3/122 16/354 |
| 5,001,862 A * | 3/1991 | Albenda | ................. | E06B 7/367 16/251 |
| 5,224,240 A * | 7/1993 | Smith | ................. | E05D 11/0054 16/251 |
| 6,276,026 B1 * | 8/2001 | Wille | ................. | E05D 11/0054 16/250 |
| 6,434,888 B1 * | 8/2002 | Shaw | ..................... | E06B 7/367 16/258 |
| 6,477,809 B1 * | 11/2002 | Dorner | .................... | E06B 7/367 49/383 |
| 7,694,915 B2 * | 4/2010 | Mindermann | .......... | E05D 7/009 244/130 |
| 7,836,635 B2 * | 11/2010 | Webb | ..................... | E06B 7/367 49/384 |
| 7,861,375 B2 * | 1/2011 | Conway | ................ | E05F 1/1215 16/285 |
| 7,861,465 B1 * | 1/2011 | Christ | .................... | E06B 7/367 49/506 |
| 8,108,980 B2 * | 2/2012 | Eveker | .................... | E05D 11/00 29/434 |
| 9,181,749 B1 * | 11/2015 | Davis | ..................... | E06B 7/367 |
| 9,297,190 B2 * | 3/2016 | Lee | ......................... | E05D 3/122 |
| 2003/0205001 A1 * | 11/2003 | Williams | ................ | E06B 7/367 49/383 |
| 2010/0088962 A1 * | 4/2010 | McRoskey | ................ | E06B 7/36 49/303 |
| 2011/0203179 A1 * | 8/2011 | Boens | ..................... | E06B 7/36 49/142 |
| 2011/0214355 A1 * | 9/2011 | Kim | .................... | E05D 11/0054 49/383 |
| 2015/0096145 A1 | 4/2015 | Nakao | | |
| 2016/0083092 A1 | 3/2016 | Long et al. | | |

FOREIGN PATENT DOCUMENTS

| | | |
|---|---|---|
| JP | H04-030691 | 3/1992 |
| JP | H08-013933 | 1/1996 |
| JP | 2013-224525 | 10/2013 |
| WO | WO 2013/157273 | 10/2013 |
| WO | WO 2015/148813 | 10/2015 |

\* cited by examiner

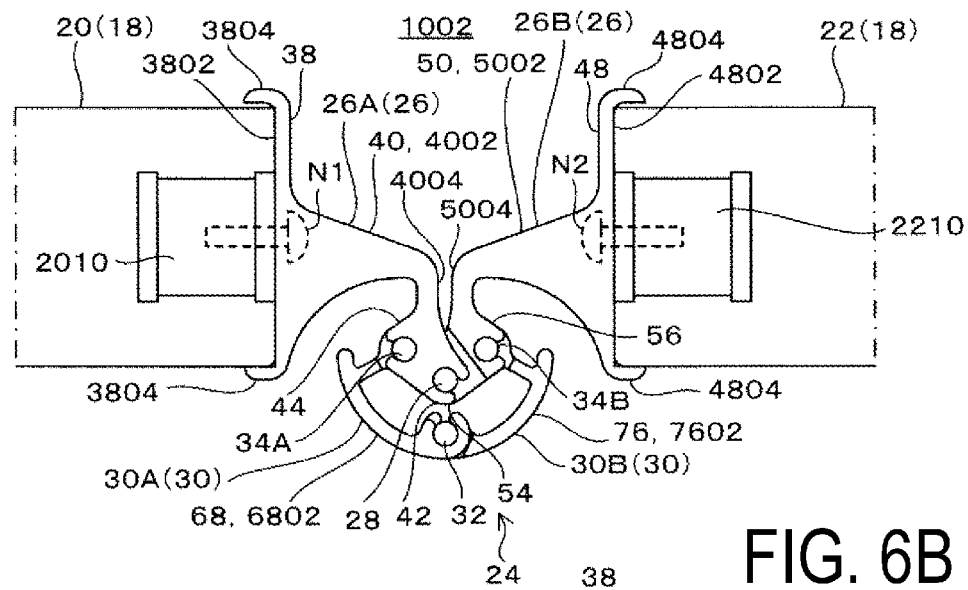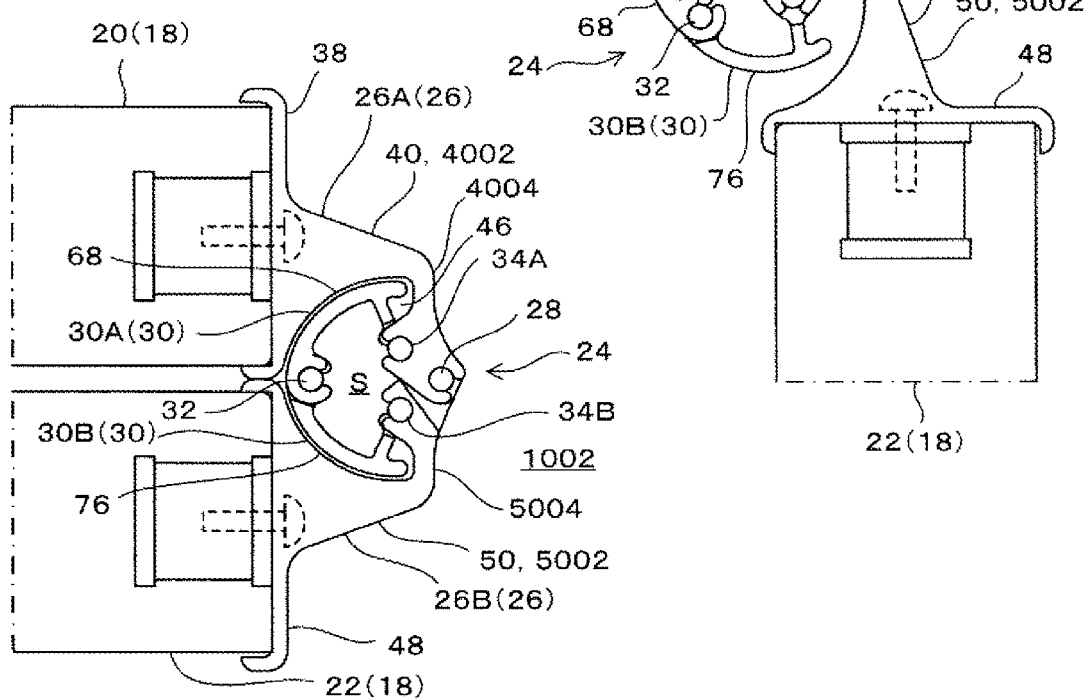

JOINING STRUCTURE OF TWO DOOR MEMBERS FORMING DOOR FOR ENTRANCE OPENING AND CLOSING OF AIRCRAFT LAVATORY UNIT

TECHNICAL FIELD

The present technology relates to a joining structure of two door members that form a door for entrance opening and closing of an aircraft lavatory unit.

BACKGROUND ART

The door for entrance opening and closing of an aircraft lavatory unit has a first door member and a second door member that are foldably joined to each other, and these two door members are configured to close the entrance in an extended state and configured to open the entrance in a folded state in a convex shape toward the lavatory side.

The door for entrance opening and closing is required by each airline company to have a predetermined durability performance and also required to have no light leakage when the lavatory is used and to have a good appearance.

In the related art, in order to prevent light leakage when using a lavatory, it has been proposed to provide a cover made of a flexible material such as rubber or the like between the end portions of two doors facing each other.

However, the cover is folded and deformed when opening and closing the entrance, so the cover becomes a resistance when the two door members are folded, and there is room for improvement in terms of opening and closing operability of the door for entrance opening and closing, and there is also room for improvement in terms of appearance.

SUMMARY

The present technology provides a joining structure of two door members that form a door for entrance opening and closing of an aircraft lavatory unit having excellent opening and closing operability and able to meet the requirements of durability performance, light leakage, and appearance.

The present technology is a joining structure of two door members forming a door for entrance opening and closing of an aircraft lavatory unit including:

a door member for entrance opening and closing for opening and closing an entrance of a lavatory of an aircraft lavatory unit;

the door member for entrance opening and closing including a first door member and a second door member that are foldably joined to each other, the two door members being configured to close the entrance in an extended state and being configured to open the entrance in a folded state in a convex shape toward a side of the lavatory;

the joining structure including:

a pair of brackets respectively protruding from opposite end portions of the first door member and the second door member;

a bracket joining shaft that joins tip portions of the pair of brackets swingably; and a pair of covers, one end of each being joined to a section of the pair of brackets around the bracket joining shaft swingably by a bracket cover joining shaft, an other end of each being joined swingably by a cover joining shaft, at a section farther away from the lavatory than the bracket joining shaft;

the pair of covers, with the first door member and the second door member being in an extended state, covering sections of the pair of brackets around the bracket joining shaft over the entire length in a vertical direction from the outside of the lavatory.

Moreover, in the present technology, the pair of brackets includes: mounting plate portions attached to opposite end portions of the first door member and the second door member in an extended state;

upright portions standing upright from the mounting plate portions; and bent portions extending from tip portions of the upright portions in directions away from the lavatory;

shaft receiving portions that support the bracket joining shaft are provided at tip portions of the bent portions; and shaft receiving portions that support the bracket cover joining shaft are provided at sections of the tip portions the bent portions that face the mounting plate portions, at sections nearer to the mounting plate portions than the shaft receiving portions.

In addition, in the present technology, the pair of covers, with the first door member and the second door member being in a folded state, is housed in a space between the mounting plate portions, the upright portions, and the bent portions of the pair of brackets.

Furthermore, in the present technology, a plurality of shaft receiving portions that support the bracket joining shaft of the pair of brackets are provided at intervals in a vertical direction of the mounting plate portion;

the plurality of shaft receiving portions of the pair of brackets are arranged alternately in the vertical direction; and a torsion spring for applying a bias force to the first door member and the second door member in an extended state; wherein the torsion spring includes a coil portion and a pair of rod-like portions protruding from both ends of the coil portion; and in the torsion spring, the coil portion is disposed between shaft receiving portions of the pair of brackets, the bracket joining shaft is inserted through an inside of the coil portion, and one of the pair of rod-like portions is abutted against one bracket of the pair of brackets, and an other of the pair of rod-like portions is abutted against an other bracket of the pair of brackets.

Moreover, in the present technology, the pair of covers includes:

a main body plate portion, an outer circumferential surface of which is arc shaped and extends in the vertical direction;

a shaft receiving portion that is provided at one end in an arc direction of an inner circumferential surface of the main body plate portion and supports the cover joining shaft; and a shaft receiving portion that is provided on an other end in the arc direction of the inner circumferential surface of the main body plate portion and supports the bracket cover joining shaft;

a plurality of the shaft receiving portions that support the cover joining shaft are provided at intervals in an extending direction of the main body plate portion;

a length in the arc direction of a section of the main body plate portion where the shaft receiving portion that supports the cover joining shaft is provided is larger, compared to a section of the main body plate portion where the shaft receiving portion is not provided;

a shaft receiving portion, supporting the cover joining shaft, of one cover of the pair of covers and a shaft receiving portion, supporting the cover joining shaft, of an other cover of the pair of covers are alternately arranged in the vertical direction;

an end portion in the arc direction of the main body plate portion provided with a shaft receiving portion, supporting the cover joining shaft, of one cover of the pair of covers comes in contact with an end portion in the arc direction of the main body plate portion where the shaft receiving portion, supporting the cover joining shaft, of an other cover of the pair of covers is not provided;

an end portion in the arc direction of the main body plate portion provided with a shaft receiving portion, supporting the cover joining shaft, of an other cover of the pair of covers comes in contact with an end portion in the arc direction of the main body plate portion where the shaft receiving portion, supporting the cover joining shaft, of one cover of the pair of covers is not provided;

facing each other in the vertical direction, an end surface of a shaft receiving portion, supporting the cover joining shaft, of one cover of the pair of covers comes in contact with an end surface of a shaft receiving portion, supporting the cover joining shaft, of an other cover of the pair of covers; and with the first door member and the second door member being in an extended state, the outer circumferential surfaces of the main body plate portions of the pair of covers are cylindrical surfaces continuous in the vertical direction.

According to the present technology, joining sections of a pair of brackets and joining sections of a pair of covers all have a pivotal structure, so two door members may be smoothly folded and extended without the occurrence of resistance, which is advantageous in improving the opening and closing operability of a door for entrance opening and closing and improving the durability performance of the door for entrance opening and closing.

In addition, with an entrance being in a closed state by the door for entrance opening and closing, the pair of covers covers a section of the pair of brackets around a bracket joining shaft over the entire length in a vertical direction from the outside of a lavatory, so this is advantageous in effectively preventing light leakage from the lavatory during use and is also advantageous in improving appearance.

Moreover, with the entrance being in a closed state by the door for entrance opening and closing, only mounting plate portions and upright portions of the pair of brackets may be seen from the inside of the lavatory, and most of the sections where the pair of brackets are joined by the bracket joining shaft are hidden by the upright portions of the pair of brackets, so this is advantageous in improving the appearance from the inside of the lavatory.

Furthermore, with the entrance being in an opened state by folding a pair of door members, the pair of covers is housed in the space between the mounting plate portions, the upright portions, and bent portions of the pair of brackets, so this is advantageous in that the pair of door members may be folded smoothly.

In addition, a torsion spring for applying a bias force to the pair of door members in an extended state may be arranged at a location hidden by the pair of covers, which is advantageous in improving the appearance of the door for entrance opening and closing.

Moreover, with the entrance being in a closed state by the door for entrance opening and closing, outer circumferential surfaces of main body plate portions of the pair of covers are cylindrical surfaces continuous in the vertical direction, so this is even more advantageous in improving the appearance of the door for entrance opening and closing.

BRIEF DESCRIPTION OF DRAWINGS

FIGS. 6A to 6C are plan views illustrating an extended state and a folded state of the joining structure of the first door member and the second door member.

DETAILED DESCRIPTION

Hereinafter, embodiments of the present technology will be described.

Figure 1:
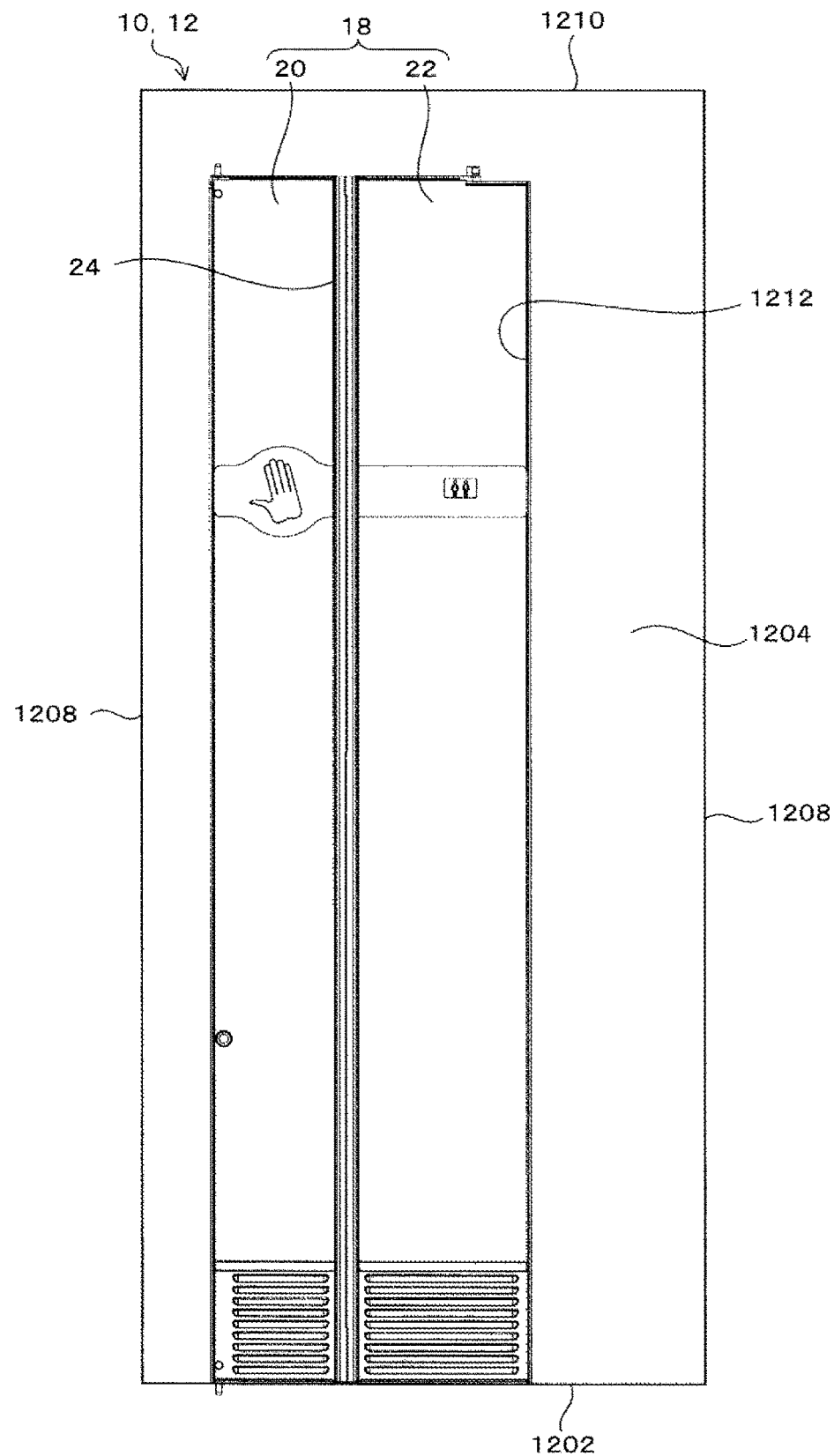
FIG. 1 is a front view of an aircraft lavatory unit, with an entrance of a lavatory being in a closed state.
Figure 2:
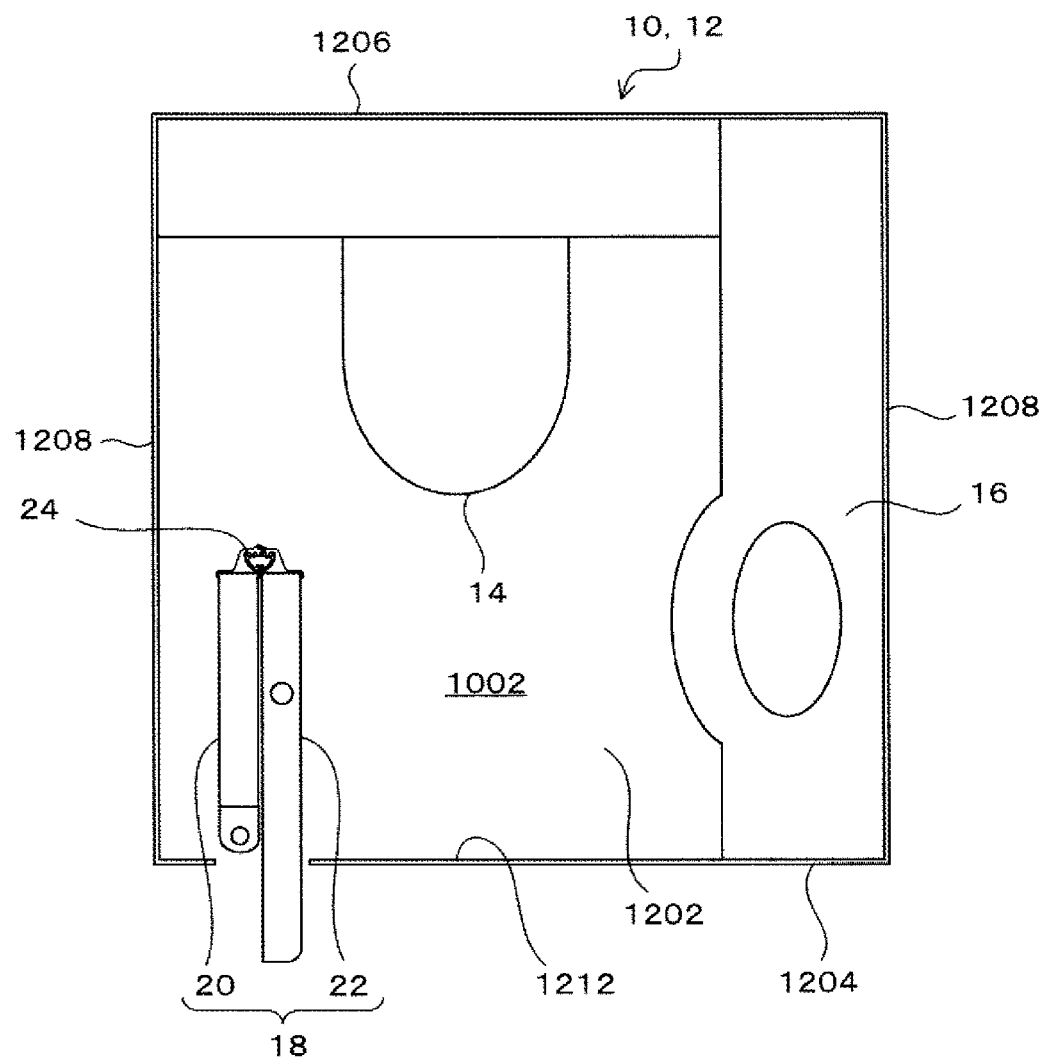
FIG. 2 is a plan view of an aircraft lavatory unit, with the entrance of the lavatory being in an opened state.

As illustrated in FIGS. 1 and 2, a body 12 of the aircraft lavatory unit 10 includes: a floor plate 1202; a front wall 1204 and a rear wall 1206 standing upright from the floor plate 1202 and facing each other; a pair of side walls 1208 standing upright from the floor plate 1202 and connecting both sides of the front wall 1204 and the rear wall 1206; and a ceiling 1210, a toilet 14 is provided at a section on the floor plate 1202 near the rear wall 1206, a sink 16 is provided on one side wall 1208 of the pair of side walls 1208, and the inside of the body 12 is a lavatory 1002.

An entrance 1212 of the lavatory 1002 is provided in the front wall 1204.

A door member for entrance opening and closing 18 that opens and closes the entrance 1212 is formed by two door members, a first door member 20 and a second door member 22 that are foldably joined to each other.

The first door member 20 and the second door member 22 are foldably joined by a joining structure 24, where the entrance 1212 is closed, with the first door member 20 and the second door member 22 being in an extended state, or in other words, in a state in which these door members 20, 22 extend along the same straight line when viewed in a plan view, and the entrance 1212 is open, with the first door member 20 and the second door member 22 being in a folded state in a convex shape toward the lavatory 1002 side.

Figure 3:
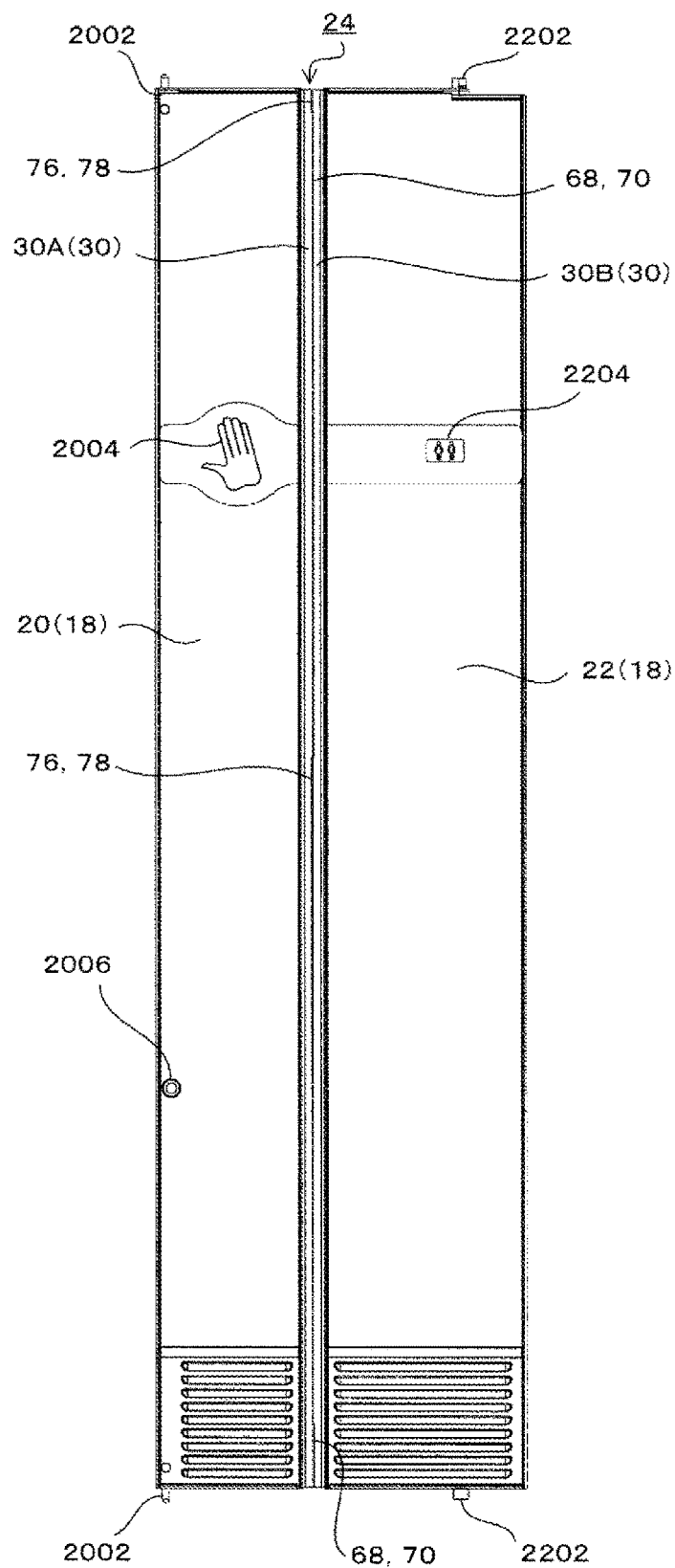
FIG. 3 is a front view of a door for entrance opening and closing, with a first door member and a second door member being in an extended state.

As illustrated in FIG. 3, a shaft 2002 is provided so as to be movable up and down on upper and lower end surfaces of an end portion of the first door member 20 located opposite to the second door member 22, the shaft 2002 is inserted into a hole of a mounting frame (not illustrated) provided in the entrance 1212, and in the entrance 1212, the first door member 20 is arranged swingably around the shaft 2002.

Moreover, a sliding member 2202 is provided on upper and lower end surfaces of an end portion of the second door member 22 located opposite to the first door member 20, this sliding member 2202 is engaged with a guide rail of the mounting frame (not illustrated) provided at the entrance 1212, and the sliding member 2202 moves along the guide rail when the entrance 1212 is opened and closed.

Note that in FIG. 3, a reference sign 2004 denotes an indicator portion configured to indicate that the first door member 20 is to be pressed by hand, a reference sign 2006 denotes a rubber base that cushions the impact when the first door member 20 and the second door member 22 are folded, and a reference sign 2204 denotes a lamp that indicates that the lavatory 1002 is in use.

In addition, a damper (not illustrated) is provided that slows down the movement of the first door member 20 and the second door member 22 when transitioning from a folded state to an extended state and suppresses the impact noise when closing the entrance 1212.

Figure 4:
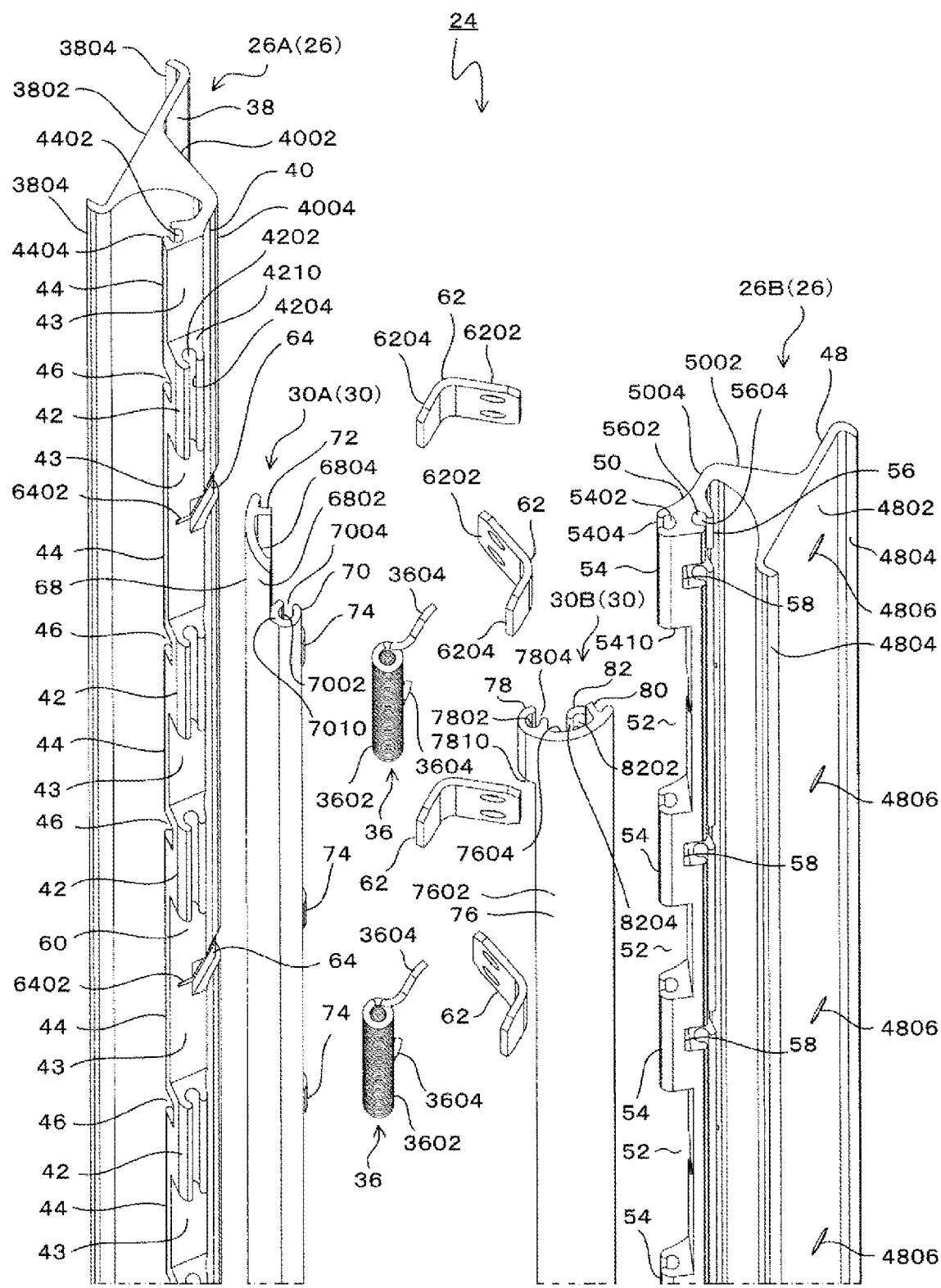
FIG. 4 is a perspective view of each component viewed from the outside of the lavatory, with each component constituting a joining structure of the first door member and the second door member removed from a door member.
Figure 5:
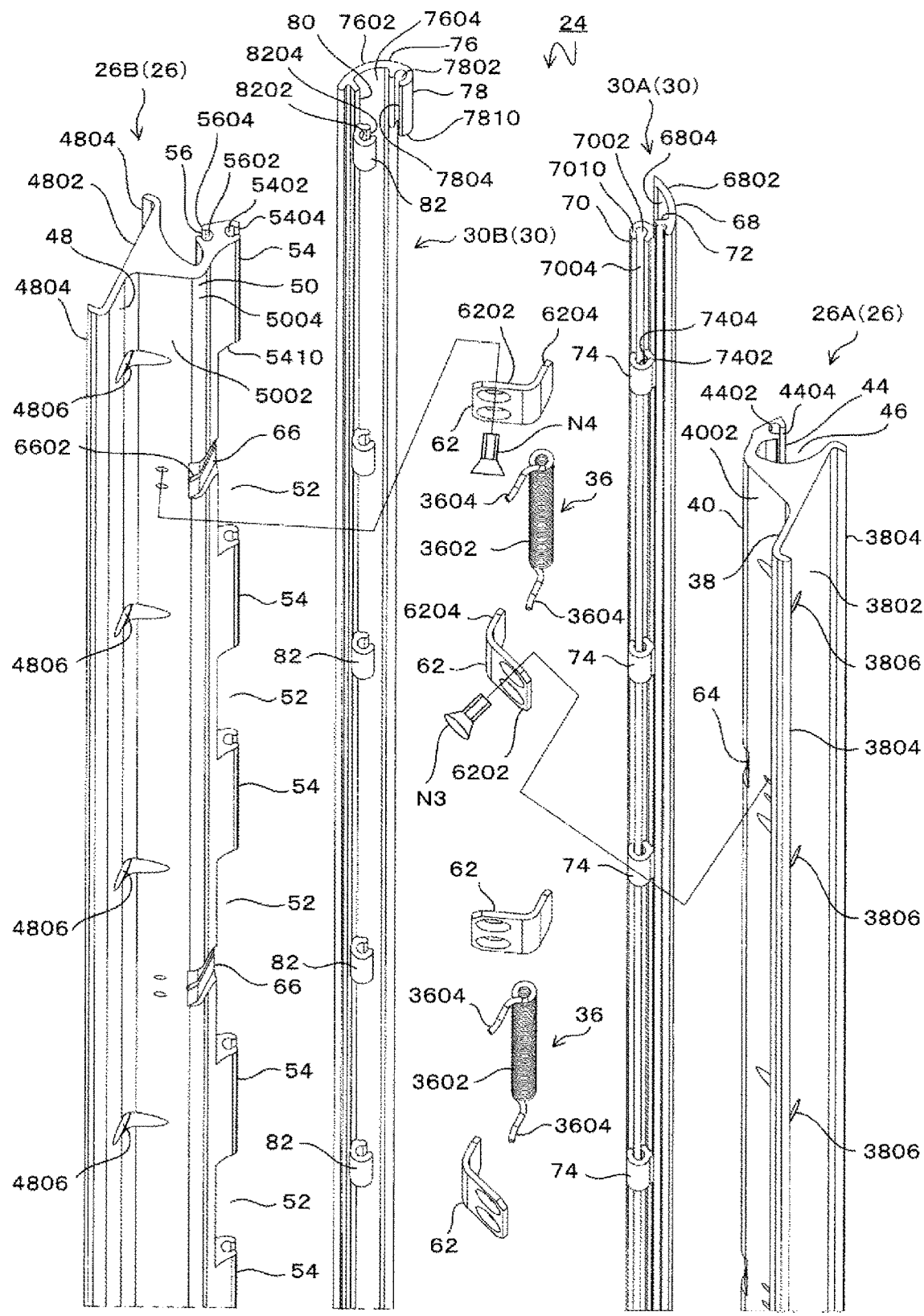
FIG. 5 is a perspective view of each component viewed from the inside of the lavatory with each component constituting the joining structure of the first door member and the second door member removed from the door member.

As illustrated in FIGS. 4, 5, and 6, the joining structure 24 of the two door members 20, 22 that form the door member for entrance opening and closing 18 is configured to include a pair of brackets 26, a bracket joining shaft 28, a pair of covers 30, a cover joining shaft 32, bracket cover joining shafts 34, and torsion springs 36.

The pair of brackets 26 includes: a first bracket 26A attached to an end portion of the first door member 20 on the second door member 22 side; and a second bracket 26B attached to an end portion of the second door member 22 on the first door member 20 side, and the first bracket 26A and the second bracket 26B are joined swingably by the bracket joining shaft 28.

The pair of covers 30 includes: a first cover 30A and a second cover 30B, where one end of the first cover 30A is joined to the first bracket 26A swingably by a bracket cover joining shaft 34A, and one end of the second cover 30B is joined to the second bracket 26B swingably by the bracket cover joining shaft 34B.

The other end of the first cover 30A and the other end of the second cover 30B are joined swingably by the cover joining shaft 32.

The first bracket 26A and the second bracket 26B satisfy the requirements for durability and appearance of the joining structure 24, so they are formed of a lightweight metal material with strength and rigidity such as an aluminum alloy or the like, and the first cover 30A and the second cover 30B do not receive the load of the door member for entrance opening and closing 18, so they are formed of a lightweight metal material such as an aluminum alloy or the like; or a synthetic resin.

From the perspective of durability, the bracket joining shaft 28, the cover joining shaft 32, and the bracket cover joining shafts 34A, 34B are made of a steel rod material such as piano wire or the like.

As illustrated in FIGS. 4 and 5, the first bracket 26A has: a mounting plate portion 38 attached to an end portion of the first door member 20; and a hinge portion 40 protruding from the mounting plate portion 38.

The mounting plate portion 38 has: a base portion 3802 that comes into contact with an end surface of the end portion of the first door member 20; and a pair of flanges 3804 that stand up from both sides of the base portion 3802 and that are fitted to a side surface of the first door member 20, where the base portion 3802 and the pair of flanges 3804 have a length extending over the entire length in a vertical direction of the end portion of the first door member 20.

Mounting holes 3806 are formed at a plurality of sections at intervals in the vertical direction from the mounting plate portion 38, and as illustrated in FIG. 6A, screws N1 inserted into the mounting holes 3806 are screwed into female screw members 2010 embedded in the end portion of the first door member 20 to attach the first bracket 26A to the end portion of the first door member 20. Note that the first bracket 26A may be attached to the first door member 20 by using an adhesive instead of the screws N1.

The hinge portion 40 has an upright portion 4002 that stands up from the mounting plate portion 38 at a substantially right angle and, as illustrated in FIG. 6A, has a bent portion 4004 that extends in a direction away from the lavatory 1002 from a tip portion of the upright portion 4002, with the entrance 1212 being in a closed state, and the upright portion 4002 and the bent portion 4004 have a length extending over the entire length in the vertical direction of the end portion of the first door member 20.

A first shaft receiving portion 42 that supports the bracket joining shaft 28 is provided at a tip portion of the bent portion 4004, and a second shaft receiving portion 44 that supports the bracket cover joining shaft 34A is provided at a section on the base portion 3802 side of the bent portion 4004.

As illustrated in FIG. 4, the first shaft receiving portion 42 is configured to include: a shaft receiving hole 4202 that supports the bracket joining shaft 28; and a cutout portion 4204 that allows the bracket joining shaft 28 to be inserted into and removed from the shaft receiving hole 4202.

A plurality of the first shaft receiving portions 42 are provided at intervals in an extending direction of the first bracket 26A, and between the first shaft receiving portions 42 are cutout portions 43 where first shaft receiving portions 42 are not provided, with a section above the uppermost first shaft receiving portion 42 also being the cutout portion 43 where the first shaft receiving portion 42 is not provided.

As illustrated in FIGS. 4 and 5, the second shaft receiving portion 44 is configured to include: a shaft receiving hole 4402 that supports the bracket cover joining shaft 34A; and a cutout portion 4404 that allows the bracket cover joining shaft 34A to be inserted into and removed from the shaft receiving hole 4402.

Figure 11:
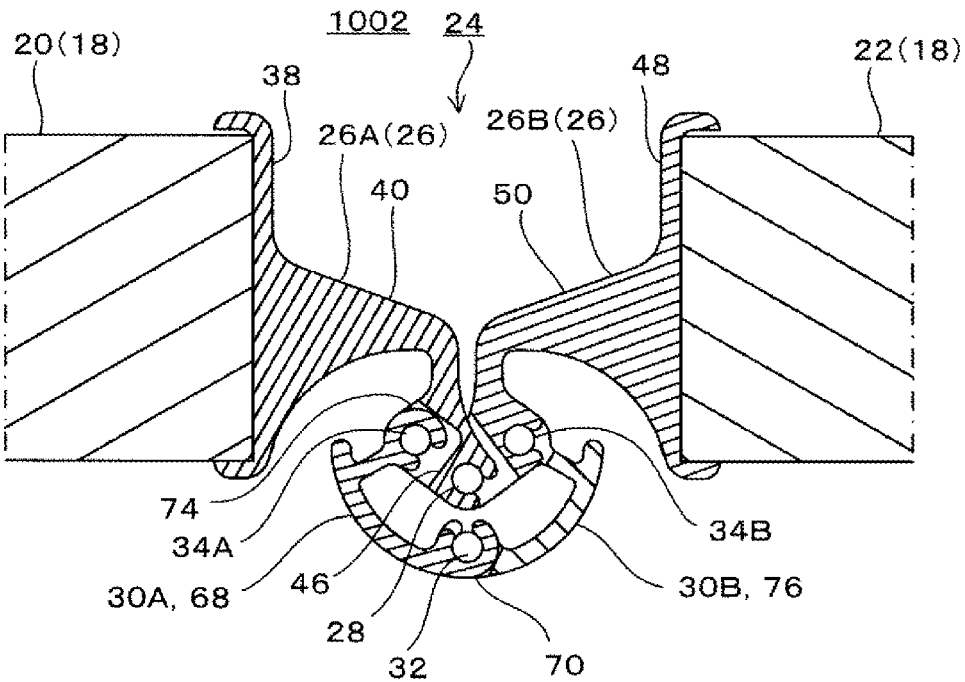
FIG. 11 is a cross-sectional view taken along D-D in FIG. 7.

Moreover, as illustrated in FIGS. 4 and 11, at each section of the second shaft receiving section 44 provided with the first shaft receiving portion 42, a cutout portion 46, into which a sixth shaft receiving portion 74 of the first cover 30A is inserted, which will be described later, is formed on the mounting plate portion 38 side in an open state, at a section where the second shaft receiving portion 44 faces the mounting plate portion 38.

As illustrated in FIGS. 4 and 5, the second bracket 26B has: a mounting plate portion 48 attached to an end portion of the second door member 22; and a hinge portion 50 protruding from the mounting plate portion 48.

The mounting plate portion 48 has: a base portion 4802 that comes into contact with an end surface of the end portion of the second door member 22; and a pair of flanges 4804 that stand up from both sides of the base portion 4802 and that are fitted to a side surface of the second door member 22, where the base portion 4802 and the pair of flanges 4804 have a length extending over the entire length in the vertical direction of the end portion of the second door member 22.

Mounting holes 4806 are formed at a plurality of sections at intervals in the vertical direction from the mounting plate portion 48, and as illustrated in FIG. 6A, screws N2 inserted through the mounting hole 4806 are screwed into female screw members 2210 embedded in the end portion of the second door member 22 to attach the second bracket 26B to the end portion of the second door member 22. Note that the second bracket 26B may be attached to the second door member 22 by using an adhesive instead of the screws N2.

The hinge portion 50 has an upright portion 5002 that stands up from the mounting plate portion 48 at a substantially right angle and has a bent portion 5004 that extends in a direction away from the lavatory 1002 from a tip portion of the upright portion 5002, with the entrance 1212 being in a closed state; and the upright portion 5002 and the bent portion 5004 have a length extending over the entire length in the vertical direction of the end portion of the second door member 22.

A third shaft receiving portion 54 that supports the bracket joining shaft 28 is provided at a tip portion of the bent portion 5004, and a fourth shaft receiving portion 56 that supports the bracket cover joining shaft 34B is provided at a section on the base portion 4802 side of the bent portion 5004.

The third shaft receiving portion 54 is configured to include: a shaft receiving hole 5402 that supports the bracket joining shaft 28; and a cutout portion 5404 that allows the bracket joining shaft 28 to be inserted into and removed from the shaft receiving hole 5402.

A plurality of the third shaft receiving portions 54 are provided at intervals in the extending direction of the second bracket 26B, and between the third shaft receiving portions 54 are cutout portions 52 where the third shaft receiving portions 54 are not provided.

The fourth shaft receiving portion 56 is configured to include: a shaft receiving hole 5602 that supports the bracket cover joining shaft 34B; and a cutout portion 5604 that allows the bracket cover joining shaft 34B to be inserted into and removed from the shaft receiving hole 5602.

Figure 9:
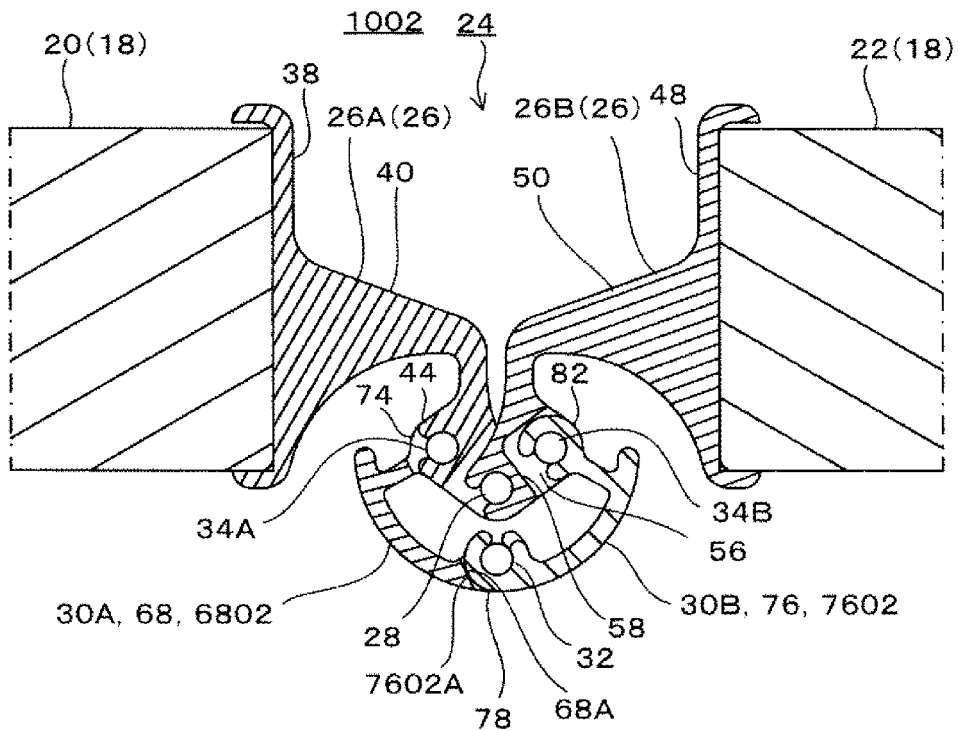
FIG. 9 is a cross-sectional view taken along B-B in FIG. 7.

In addition, as illustrated in FIGS. 4 and 9, at each section of a fourth shaft receiving portion 56 provided with a third shaft receiving portion 54, a cutout portion 58, into which an eighth shaft receiving portion 82 of the second cover 30B is inserted, which will be described later, is formed on the mounting plate portion 48 side in an open state, at a section where the fourth shaft receiving portion 56 faces the mounting plate portion 48.

As illustrated in FIGS. 4 and 5, the uppermost third shaft receiving portion 54 of the second bracket 26B is located at an upper end of the second bracket 26B, a lower end surface 5410 of the third shaft receiving portion 54 is fitted with an upper end surface 4210 of the first shaft receiving portion 42 located at the highest position of the first bracket 26A, so in this way the third shaft receiving portion 54 and the first shaft receiving portion 42 are alternately arranged in the vertical direction, and the first bracket 26A and the second bracket 26B are joined swingably by the bracket joining shaft 28 inserted through the shaft receiving hole 5402 from the cutout portions 5404, 4204 of the third shaft receiving portions 54 and the first shaft receiving portions 42.

Note that conventionally known configurations, in which shaft receiving holes of two members are joined to one support shaft, may also be employed, such that the bracket joining shaft 28 is joined to one of the shaft receiving holes 5402 or 4202 of the third shaft receiving portions 54 and the first shaft receiving portions 42 so as not to be movable in the vertical direction and not rotatable and is joined to the other shaft receiving holes 5602 or 4202 of the third shaft receiving portions 54 and the first shaft receiving portions 42 so as to be rotatable; or such that the bracket joining shaft 28 is joined in a manner that a large-diameter portion larger than the shaft receiving holes 5402, 4202 provided at the upper end of the bracket joining shaft 28 is locked to the upper end surface of the third shaft receiving portion 54 located at the uppermost position, so the bracket joining shaft 28 is able to rotate in the shaft receiving holes 5602 of both the third shaft receiving portions 54 and the first shaft receiving portions 42.

In addition, the end surfaces of the third shaft receiving portions 54 come in contact with the end surfaces of the first shaft receiving portions 42 that are opposed to each other in the vertical direction, except for a section where the torsion springs 36 are disposed.

Figure 7:
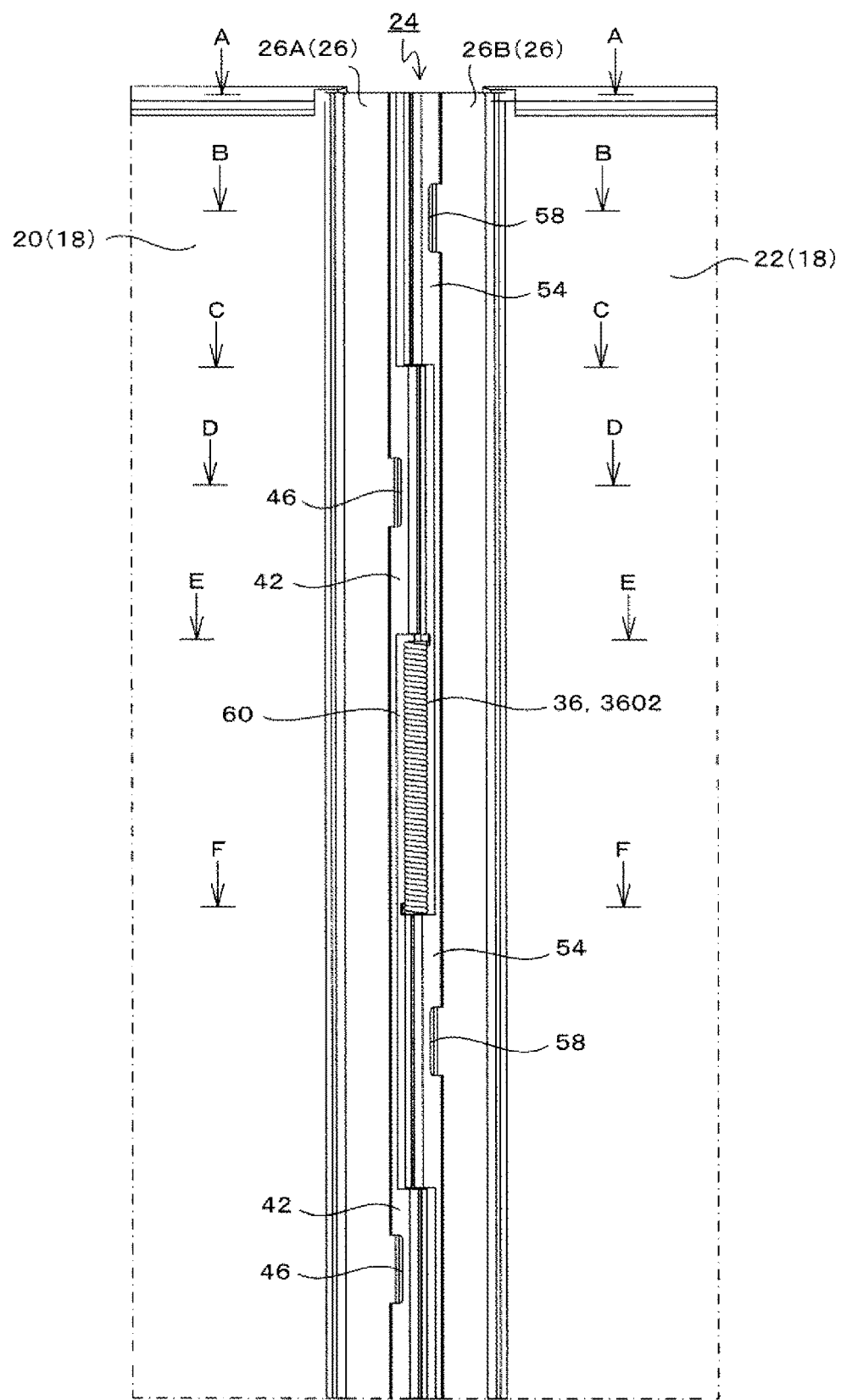
FIG. 7 is a front view, as seen from the outside of the lavatory, of an upper portion of the joining structure of the first door member and the second door member in an extended state where the cover is removed.

The third shaft receiving portions 54 of the second bracket 26B and the first shaft receiving portions 42 of the first bracket 26A are vertically arranged in this way; however, as illustrated in FIG. 7, at the plurality of sections where these shaft receiving portions 54, 42 are arranged, spaces 60 extending in the vertical direction are maintained between the lower end surfaces of the first shaft receiving portions 42 and the upper end surfaces of the third shaft receiving portions 54, via the cutout portions 43, 52, and the torsion spring 36 is disposed in the spaces 60.

The torsion springs 36 apply a bias force to the first door member 20 and the second door member 22 in an extended state.

As illustrated in FIGS. 4 and 5, each torsion spring 36 has a coil portion 3602 and rod-like portions 3604 protruding from both ends of the coil portion 3602.

Figure 12:
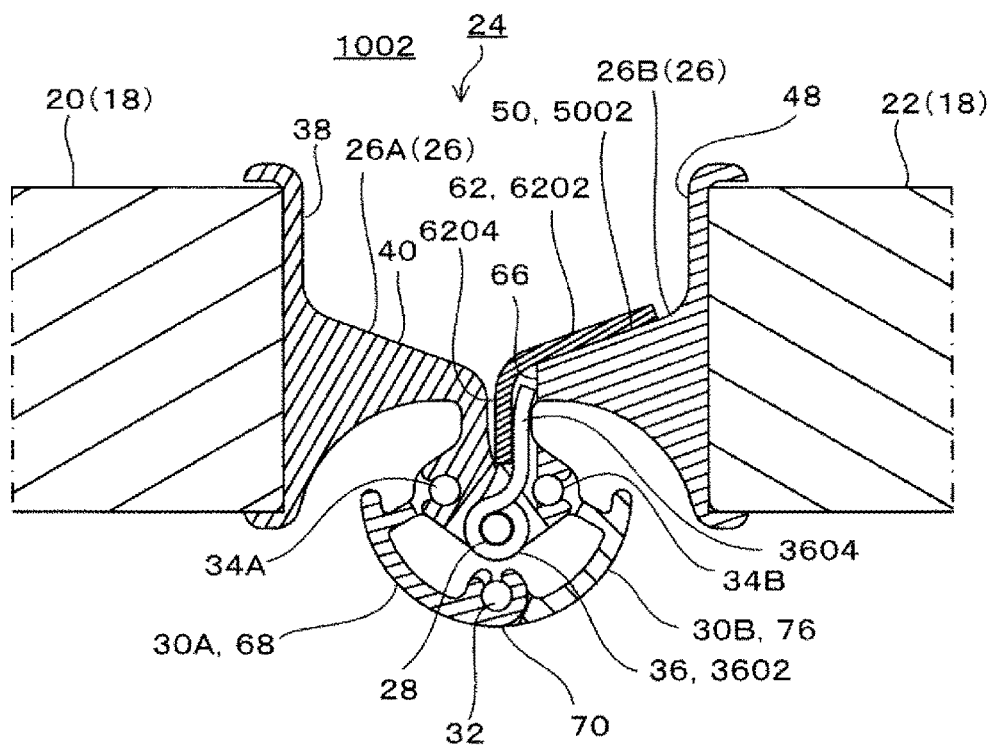
FIG. 12 is a cross-sectional view taken along E-E in FIG. 7.
Figure 13:
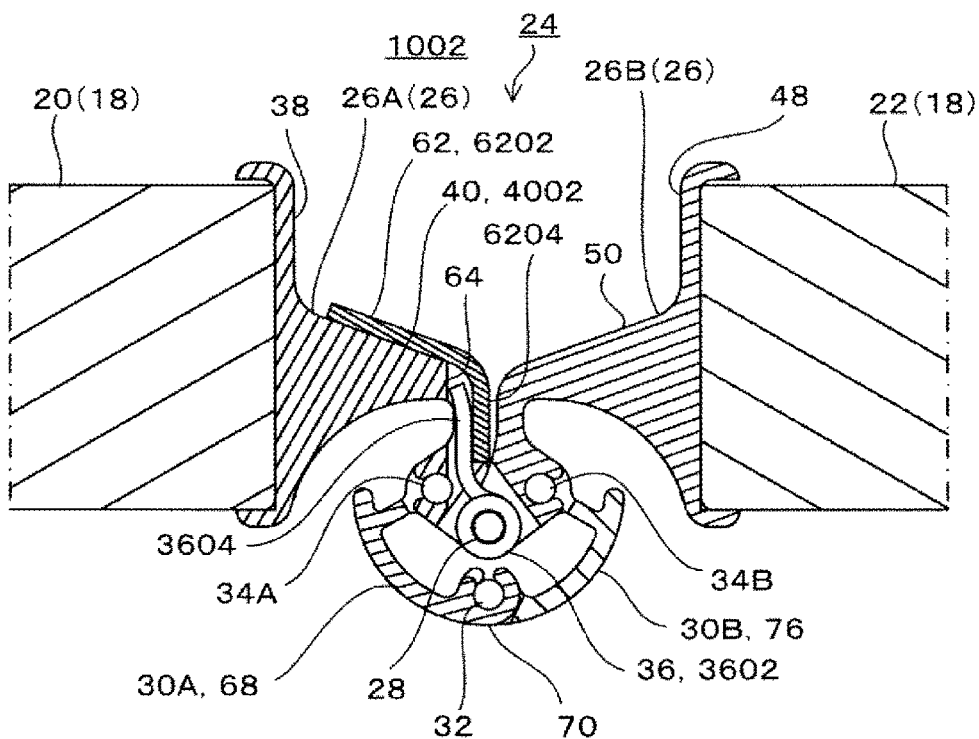
FIG. 13 is a cross-sectional view taken along F-F in FIG. 7.

As illustrated in FIGS. 7, 12, and 13, in the torsion spring 36, the coil portion 3602 is disposed between the lower end surface of a first shaft receiving portion 42 and the upper end surface of a third shaft receiving portion 54, and the bracket joining shaft 28 is inserted through the inner portion of the coil portion 3602.

As illustrated in FIG. 13, one rod-like portion 3604 is abutted against a recess portion 64 of the first bracket 26A by a tip portion 6204 of a pressing piece 62, and a base portion 6202 of the pressing piece 62 is attached to the upright portion 4002 by screws N3. As illustrated in FIG. 4, the recess portion 64 is formed so as to extend from a section of the bent portion 5004 between the upper and lower first shaft receiving portions 42 toward a section of a rear surface of the second shaft receiving portion 44, and a groove 6402 that can be locked to the rod-like portion 3604 is formed in the central portion of a bottom surface of the recess portion 64 so that the rod-like portion 3604 may be easily pressed.

As illustrated in FIG. 12, the other rod-like portion 3604 is abutted against a recess portion 66 of the second bracket 26B by the tip portion 6204 of the pressing piece 62, and the base portion 6202 of the pressing piece 62 is attached to the upright portion 5002 by screws N4. As illustrated in FIG. 5, the recess portion 66 is formed so as to extend from a section of the bent portion 5004 between the upper and lower third shaft receiving portions 54 toward a section of a rear surface of the fourth shaft receiving portion 44, and a groove 6602 that can be locked to the rod-like portion 3604 is formed in the central portion of a bottom surface of the recess portion 66 so that the rod-like portion 3604 may be easily pressed.

As illustrated in FIGS. 4 and 5, the first cover 30A includes: a main body plate portion 68 having an arc-shaped outer circumferential surface 6802; a fifth shaft receiving portion 70 that is provided at one end in an arc direction of an inner circumferential surface 6804 of the main body plate portion 68 and that supports the cover joining shaft 32; a leg portion 72 protruding from the other end in the arc direction of the inner circumferential surface 6804 of the main body plate portion 68; and the sixth shaft receiving portion 74 that is provided at a tip end of the leg portion 72 and that supports the bracket cover joining shaft 34A.

The main body plate portion 68 has a length extending over the entire length in the vertical direction of the end portions of the first and second door members 20, 22, and the outer circumferential surface 6802 of the main body plate portion 68 is formed as a cylindrical surface.

The fifth shaft receiving portion 70 is configured to include: a shaft receiving hole 7002 that supports the cover joining shaft 32; and cutout portions 7004 that allow the cover joining shaft 32 to be inserted in or removed from the shaft receiving hole 7002, with a plurality of the fifth shaft receiving portions 70 being provided at intervals in the extending direction of the main body plate portion 68, and as illustrated in FIG. 4, the length in the arc direction of the main body plate portion 68 in a section where the fifth shaft receiving portion 70 is provided is larger than the length of the main body plate portion 68 in a section where the fifth shaft receiving portion 70 is not provided.

Figure 8:
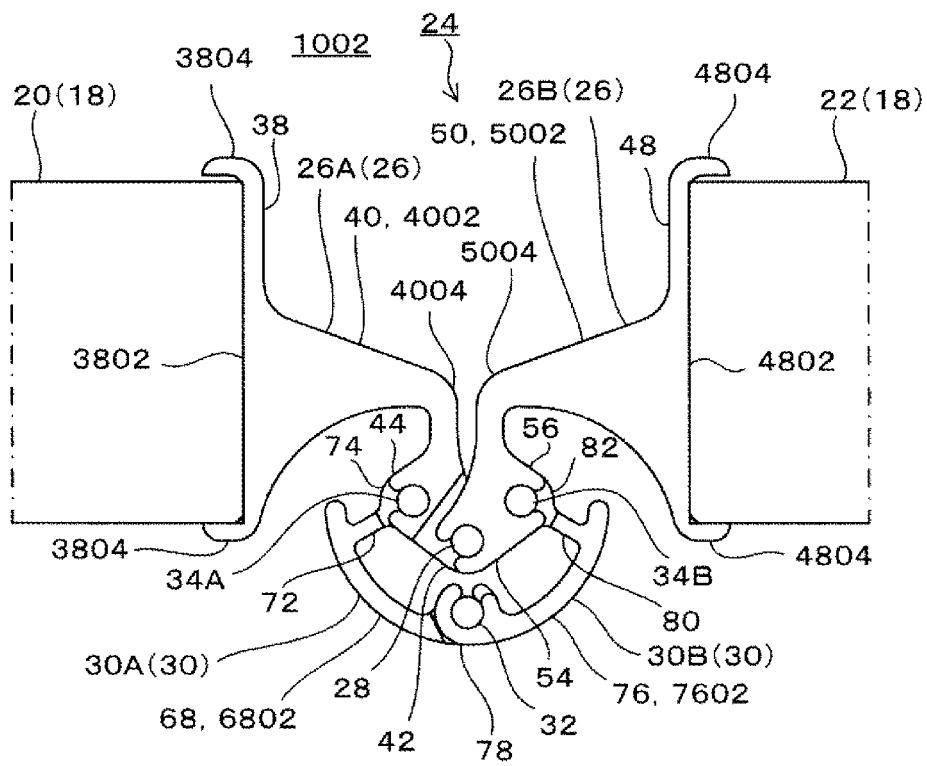
FIG. 8 is a cross-sectional view taken along A-A in FIG. 7.

Note that as illustrated in FIG. 8, the cover joining shaft 32 is disposed at a section farther away from the lavatory 1002 than the bracket joining shaft 28, with the first door member 20 and the second door member 22 being in an extended state.

As illustrated in FIGS. 5 and 11, the sixth shaft receiving portion 74 is configured to include: a shaft receiving hole 7402 that supports the bracket cover joining shaft 34A; and a cutout portion 7404 that allows the bracket cover joining shaft 34A to be inserted into and removed from the shaft receiving hole 7402, and a plurality of the sixth shaft receiving portions 74 are provided at intervals in the extending direction of the main body plate portion 68 having a size so as to be insertable into the cutout portions 46 of the first bracket 26A.

As illustrated in FIGS. 4 and 5, the second cover 30B includes: a main body plate portion 76 having an arc-shaped outer circumferential surface 7602; a seventh shaft receiving portion 78 that is provided at one end in the arc direction of an inner circumferential surface 7604 of the main body plate portion 76 and that supports the cover joining shaft 32; a leg portion 80 protruding from the other end in the arc direction of the inner circumferential surface 7604 of the main body plate portion 76; and the eighth shaft receiving portion 82 that is provided at a tip end of the leg portion 80 and that supports the bracket cover joining shaft 34B.

The main body plate portion 76 has a length extending over the entire length in the vertical direction of the end portions of the first and second door members 20, 22, and the outer circumferential surface 7602 of the main body plate portion 76 is formed as a cylindrical surface having an identical diameter as the outer circumferential surface 6802 of the first cover 30A.

The seventh shaft receiving portion 78 is configured to include: a shaft receiving hole 7802 that supports the cover joining shaft 32; and a cutout portion 7804 that allows the cover joining shaft 32 to be inserted into or removed from the shaft receiving hole 7802, a plurality of the seventh shaft receiving portions 78 are provided at intervals in the extending direction of the main body plate portion 76, and as illustrated in FIG. 4, the length in the arc direction of the main body plate portion 76 in a section where the seventh shaft receiving portion 78 is provided is larger than the length of the main body plate portion 76 in a section where the seventh shaft receiving portion 78 is not provided.

As illustrated in FIGS. 5 and 9, the eighth shaft receiving portion 82 is configured to include: a shaft receiving hole 8202 that supports the bracket cover joining shaft 34B; and a cutout portion 8204 that allows the bracket cover joining shaft 34B to be inserted into and removed from the shaft receiving hole 8202, and a plurality of the eighth shaft receiving portions 82 are provided at intervals in the extending direction of the main body plate portion 76 having a size so as to be insertable into the cutout portions 58 of the second bracket 26B.

As illustrated in FIGS. 4 and 5, the seventh shaft receiving portion 78 located at the uppermost position of the second cover 30B is located at an upper end of the second cover 30B, and an upper end surface 7010 of the fifth shaft receiving portion 70 located at the uppermost position of the first cover 30A is fitted to a lower end surface 7810 of the seventh shaft receiving portion 78, in this way, the seventh shaft receiving portion 78 and the fifth shaft receiving portion 70 are alternately arranged in the vertical direction, and the first cover 30A and the second cover 30B are joined swingably by the cover joining shaft 32 inserted through the shaft receiving holes 7802, 7002 from cutout portions 7804, 7004 of the seventh shaft receiving portions 78 and the fifth shaft receiving portions 70.

Note that conventionally known configurations, in which shaft receiving holes of two members are joined to one support shaft, may also be employed, such that the cover joining shaft 32 is joined to one of the shaft receiving holes 7802 or 7002 of the seventh shaft receiving portion 78 and the fifth shaft receiving portions 70 so as not to be movable in the vertical direction and not rotatable and is joined to the other shaft receiving holes 7802 or 7002 of the seventh shaft receiving portions 78 and the fifth shaft receiving portions 70 so as to rotatable; or such that the cover joining shaft 32 is joined in a manner that a large-diameter portion larger than the shaft receiving holes 7802, 7002 provided at the upper end of the cover joining shaft 32 is locked to the upper end surface of the seventh shaft receiving portion 78 located at the uppermost position, so the cover joining shaft 32 is able to rotate in the shaft receiving holes 7802, 7002 of both the seventh shaft receiving portions 78 and the fifth shaft receiving portions 70.

As illustrated in FIGS. 4, 5, and 11, the sixth shaft receiving portions 74 of the first cover 30A are inserted into the cutout portions 46 of the first bracket 26A, and the sixth shaft receiving portions 74 of the first cover 30A and the second shaft receiving portions 44 of the first bracket 26A are joined swingably by the bracket cover joining shaft 34A that is inserted through the shaft receiving holes 7402 of the sixth shaft receiving portions 74 and the shaft receiving holes 4402 of the second shaft receiving portions 44 of the first bracket 26A.

As illustrated in FIGS. 4, 5, and 9, the eight shaft receiving portions 82 of the second cover 30B are inserted into the cutout portions 58 of the second bracket 26B, and the eighth shaft receiving portions 82 of the second cover 30B and the fourth shaft receiving portions 56 of the second bracket 26B are joined swingably by the bracket cover joining shaft 34B that is inserted through the shaft receiving holes 8202 of the eighth shaft receiving portions 82 and the shaft receiving holes 5602 of the fourth shaft receiving portions 56 of the second bracket 26B.

Note that various conventionally known configurations may be adopted such that, similar to as described above, the shaft receiving holes of the two members are joined to one support shaft, for the case of joining of the bracket cover joining shaft 34A with respect to the sixth shaft receiving portions 74 of the first cover 30A and the second shaft receiving portions 44 of the first bracket 26A; and for the case of joining of the bracket cover joining shaft 34B with respect to the eighth shaft receiving portions 82 of the second cover 30B and the fourth shaft receiving portions 56 of the second bracket 26B.

In this way, with the entrance 1212 being in a closed state in which the pair of covers 30 is joined to the pair of brackets 26 and in which the first door member 20 and the second door member 22 are extended, as illustrated in FIGS. 3 and 6A, due to the pair of covers 30, the section of the pair of brackets 26 around the bracket joining shaft 28, or in other words, the bent portions 4004, 5004 of the pair of brackets 26, is hidden by the body plate portions 68, 76 of the pair of covers 30 over the entire length in the vertical direction.

Note that, as illustrated in FIG. 3, the vertical length of the main body plate portion 76 where the uppermost seventh shaft receiving portion 78 of the second cover 30B is located is short, arranged below, the vertical lengths of: the main body plate portion 68 where the fifth shaft receiving portion 70 of the first cover 30A is located; and the main body plate portion 76 where the seventh shaft receiving portion 78 of the second cover 30B is located are large, and the vertical length of the main body plate portion 68 where the lowermost fifth shaft receiving portion 70 of the first cover 30A is located is also short.

Figure 10:
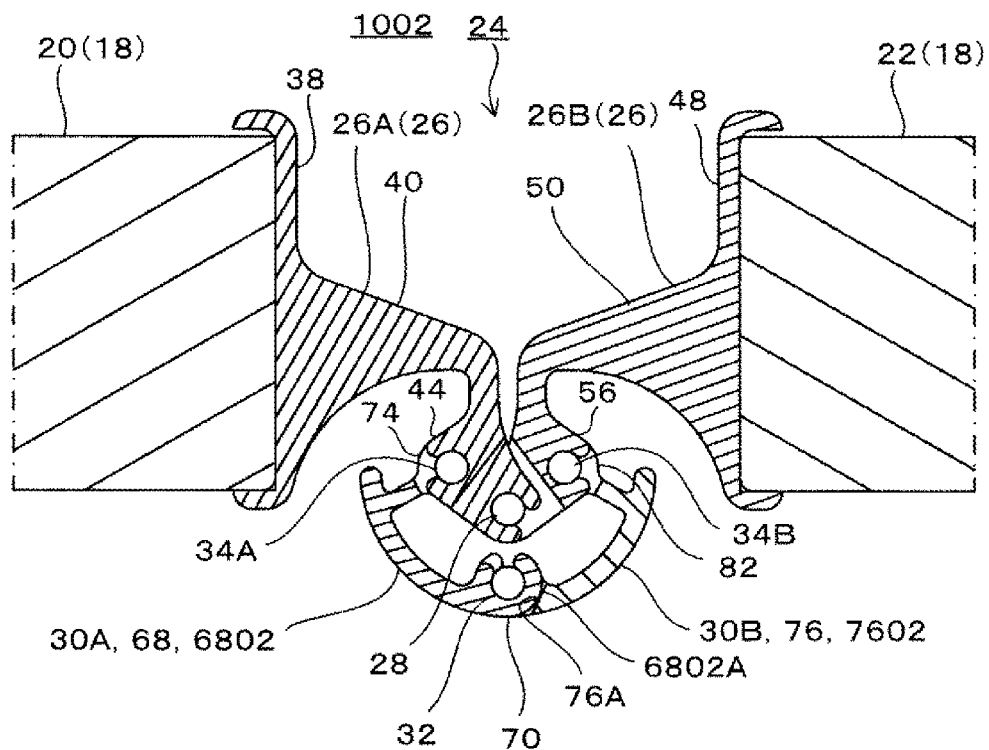
FIG. 10 is a cross-sectional view taken along C-C in FIG. 7.

Moreover, as illustrated in FIG. 9, an end portion 7602A in the arc direction of the outer circumferential surface 7602 of the main body plate portion 76 where the seventh shaft receiving portion 78 of the second cover 30B is located is substantially in contact with an end portion 68A in the arc direction of the main body plate portion 68 where the fifth shaft receiving portion 70 of the first cover 30A is not provided, similarly, as illustrated in FIG. 10, an end portion 6802A in the arc direction of the outer circumferential surface 6802 of the main body plate portion 68 where the fifth shaft receiving portion 70 of the first cover 30A is located is substantially in contact with an end portion 76A in the arc direction of the main body plate portion 76 where the seventh shaft receiving portion 78 of the second cover 30B is not provided, and further, facing each other in the vertical direction, the end surface of the seventh shaft receiving portion 78 of the second cover 30B and the end surface of the fifth shaft receiving portion 70 of the first cover 30A are substantially in contact with each other.

Therefore, with the entrance 1212 being in a closed state in which the first door member 20 and the second door member 22 are extended, a cylindrical surface that is in a convex shape and continuous in the vertical direction without gaps is formed on the outside of the lavatory 1002, by the outer circumferential surface 6802 of the main body plate portion 68 of the first cover 30A and the outer circumferential surface 7602 of the main body plate portion 76 of the second cover 30B, which is more advantageous in improving the appearance.

Moreover, with the entrance 1212 being in a state in which the first door member 20 and the second door member 22 are folded, as illustrated in FIG. 6C, the pair of covers 30 is housed in a space S between the mounting plate portions 38, 48 of the pair of brackets 26, the upright portions 4002, 5002, and the bent portions 4004, 5004, and thus folding of the first door member 20 and the second door member 22 may be performed smoothly.

With the joining structure 24 of two door members that form the door member for entrance opening and closing 18 of an aircraft lavatory unit 10 of the present embodiment, the pair of brackets 26 provided on the pair of door members 20, 22 are joined swingably by the bracket joining shaft 28, and furthermore, together with one ends of the pair of covers 30 being joined swingably to the cover joining shaft 32, the other ends of the pair of covers 30 are joined to the respective pair of brackets 26 swingably by the bracket cover joining shafts 34A, 34B. In other words, all of the joining sections have a pivotal structure, so compared with a conventional case in which a cover made of a flexible material such as rubber is interposed between the end portions of two doors for deformation, this structure is advantageous in that the two door members may be smoothly folded and extended without the occurrence of resistance, the opening and closing operability of the door member for entrance opening and closing 18 is improved, and the durability performance of the door member for entrance opening and closing 18 is improved.

Moreover, with the entrance 1212 being in a closed state by the door member for entrance opening and closing 18, the pair of covers 30 covers a section of the pair of brackets 26 around the bracket joining shaft 28 over the entire length in the vertical direction from the outside of lavatory, so this is advantageous in effectively preventing light leakage from the lavatory 1002 during use and is advantageous in improving the appearance.

Moreover, with the pair of door members 20, 22 being in an extended state, the bracket 26 has: the mounting plate portions 38, 48 that are attached to the opposite end portions of the door members 20, 22; the upright portions 4002, 5002 standing upright from the mounting plate portions 38, 48; and the bent portions 4004, 5004 extending from the tip portions of the upright portions 4002. 5002 in directions away from the lavatory 1002. Since the first to fourth shaft receiving portions 42, 44, 54, 56 are provided at the tip portions of the bent portions 4004, 5004, with the entrance 1212 being in a closed state by the door member for entrance opening and closing 18, only the mounting plate portions 38, 48 of the pair of brackets 26 and the upright portions 4002, 5002 may be seen from the inside of the lavatory 1002, and most of the first to fourth shaft receiving portions 42, 44, 54, 56 are hidden by the upright portions 4002, 5002 of the pair of brackets 26, so this is advantageous in improving the appearance from the inside of the lavatory 1002.

The invention claimed is:

1. A joining structure of two door members forming a door for entrance opening and closing of an aircraft lavatory unit, comprising:
    a door member for entrance opening and closing for opening and closing an entrance of a lavatory of an aircraft lavatory unit;
    the door member for entrance opening and closing comprising a first door member and a second door member that are foldably joined to each other, the two door members being configured to close the entrance in an extended state and being configured to open the entrance in a folded state in a convex shape toward a side of the lavatory,
    the joining structure comprising:
    a pair of brackets respectively protruding from opposite end portions of the first door member and the second door member;

a bracket joining shaft that joins tip portions of the pair of brackets swingably; and a pair of covers, one end of each being joined to a section of the pair of brackets around the bracket joining shaft swingably by a bracket cover joining shaft, an other end of each being joined swingably by a cover joining shaft, at a section farther away from the lavatory than the bracket joining shaft;

the pair of covers, with the first door member and the second door member being in an extended state, covering sections of the pair of brackets around the bracket joining shaft over the entire length in a vertical direction from an outside of the lavatory.

2. The joining structure of two door members forming a door for entrance opening and closing of an aircraft lavatory unit according to claim 1, wherein the pair of brackets comprises;

mounting plate portions attached to opposite end portions of the first door member and the second door member in an extended state;

upright portions standing upright from the mounting plate portions; and bent portions extending from tip portions of the upright portions in directions away from the lavatory;

shaft receiving portions that support the bracket joining shaft are provided at tip portions of the bent portions; and shaft receiving portions that support the bracket cover joining shaft are provided at sections of the tip portions the bent portions that face the mounting plate portions, at sections nearer to the mounting plate portions than the shaft receiving portions.

3. The joining structure of two door members forming a door for entrance opening and closing of an aircraft lavatory unit according to claim 2, further comprising:

a plurality of shaft receiving portions that support the bracket joining shaft of the pair of brackets are provided at intervals in a vertical direction of the mounting plate portion;

the plurality of shaft receiving portions of the pair of brackets are arranged alternately in the vertical direction; and a torsion spring for applying a bias force to the first door member and the second door member in an extended state; wherein the torsion spring comprises a coil portion and a pair of rod-like portions protruding from both ends of the coil portion; and in the torsion spring, the coil portion is disposed between shaft receiving portions of the pair of brackets, the bracket joining shaft is inserted through an inside of the coil portion, and one of the pair of rod-like portions is abutted against one bracket of the pair of brackets, and an other of the pair of rod-like portions is abutted against an other bracket of the pair of brackets.

4. The joining structure of two door members forming a door for entrance opening and closing of an aircraft lavatory unit according to claim 2, wherein the pair of covers comprises:

a main body plate portion, an outer circumferential surface of which is arc shaped and extends in the vertical direction;

a shaft receiving portion that is provided at one end in an arc direction of an inner circumferential surface of the main body plate portion and supports the cover joining shaft; and a shaft receiving portion that is provided on an other end in the arc direction of the inner circumferential surface of the main body plate portion and supports the bracket cover joining shaft;

a plurality of the shaft receiving portions that support the cover joining shaft are provided at intervals in an extending direction of the main body plate portion;

a length in the arc direction of a section of the main body plate portion where the shaft receiving portion that supports the cover joining shaft is provided is larger, compared to a section of the main body plate portion where the shaft receiving portion is not provided;

a shaft receiving portion, supporting the cover joining shaft, of one cover of the pair of covers and a shaft receiving portion, supporting the cover joining shaft, of an other cover of the pair of covers are alternately arranged in the vertical direction;

an end portion in the arc direction of the main body plate portion provided with a shaft receiving portion, supporting the cover joining shaft, of one cover of the pair of covers comes in contact with an end portion in the arc direction of the main body plate portion where the shaft receiving portion, supporting the cover joining shaft, of an other cover of the pair of covers is not provided;

an end portion in the arc direction of the main body plate portion provided with a shaft receiving portion, supporting the cover joining shaft, of an other cover of the pair of covers comes in contact with an end portion in the arc direction of the main body plate portion where the shaft receiving portion, supporting the cover joining shaft, of one cover of the pair of covers is not provided;

facing each other in the vertical direction, an end surface of a shaft receiving portion, supporting the cover joining shaft, of one cover of the pair of covers comes in contact with an end surface of a shaft receiving portion, supporting the cover joining shaft, of an other cover of the pair of covers; and with the first door member and the second door member being in an extended state, the outer circumferential surfaces of the main body plate portions of the pair of covers are cylindrical surfaces continuous in the vertical direction.

5. The joining structure of two door members forming a door for entrance opening and closing of an aircraft lavatory unit according to claim 1, wherein the pair of covers, with the first door member and the second door member being in a folded state, is housed in a space between the mounting plate portions, the upright portions, and the bent portions of the pair of brackets.

6. The joining structure of two door members forming a door for entrance opening and closing of an aircraft lavatory unit according to claim 5, further comprising:

a plurality of shaft receiving portions that support the bracket joining shaft of the pair of brackets are provided at intervals in a vertical direction of the mounting plate portion;

the plurality of shaft receiving portions of the pair of brackets are arranged alternately in the vertical direction; and a torsion spring for applying a bias force to the first door member and the second door member in an extended state; wherein the torsion spring comprises a coil portion and a pair of rod-like portions protruding from both ends of the coil portion; and in the torsion spring, the coil portion is disposed between shaft receiving portions of the pair of brackets, the bracket joining shaft is inserted through an inside of the coil portion, and one of the pair of rod-like portions is abutted against one bracket of the pair of brackets, and an other of the pair of rod-like portions is abutted against an other bracket of the pair of brackets.

7. The joining structure of two door members forming a door for entrance opening and closing of an aircraft lavatory unit according to claim 6, wherein the pair of covers comprises:

a main body plate portion, an outer circumferential surface of which is arc shaped and extends in the vertical direction;

a shaft receiving portion that is provided at one end in an arc direction of an inner circumferential surface of the main body plate portion and supports the cover joining shaft; and a shaft receiving portion that is provided on an other end in the arc direction of the inner circumferential surface of the main body plate portion and supports the bracket cover joining shaft;

a plurality of the shaft receiving portions that support the cover joining shaft are provided at intervals in an extending direction of the main body plate portion;

a length in the arc direction of a section of the main body plate portion where the shaft receiving portion that supports the cover joining shaft is provided is larger, compared to a section of the main body plate portion where the shaft receiving portion is not provided;

a shaft receiving portion, supporting the cover joining shaft, of one cover of the pair of covers and a shaft receiving portion, supporting the cover joining shaft, of an other cover of the pair of covers are alternately arranged in the vertical direction;

an end portion in the arc direction of the main body plate portion provided with a shaft receiving portion, supporting the cover joining shaft, of one cover of the pair of covers comes in contact with an end portion in the arc direction of the main body plate portion where the shaft receiving portion, supporting the cover joining shaft, of an other cover of the pair of covers is not provided;

an end portion in the arc direction of the main body plate portion provided with a shaft receiving portion, supporting the cover joining shaft, of an other cover of the pair of covers comes in contact with an end portion in the arc direction of the main body plate portion where the shaft receiving portion, supporting the cover joining shaft, of one cover of the pair of covers is not provided;

facing each other in the vertical direction, an end surface of a shaft receiving portion, supporting the cover joining shaft, of one cover of the pair of covers comes in contact with an end surface of a shaft receiving portion, supporting the cover joining shaft, of an other cover of the pair of covers; and with the first door member and the second door member being in an extended state, the outer circumferential surfaces of the main body plate portions of the pair of covers are cylindrical surfaces continuous in the vertical direction.

\* \* \* \* \*